United States Patent [19]

Chapman et al.

[11] Patent Number: 5,330,657
[45] Date of Patent: Jul. 19, 1994

[54] SYSTEM AND METHOD FOR REMOVING ASBESTOS PARTICLES FROM A SLURRY

[75] Inventors: Gordon R. Chapman, Missouri City; Donald R. Andruik, Houston; James V. Van Matre, Baytown; Andre Stenzel, Houston; Robert J. Logan, Houston; Edwin D. McCrory, Houston; Michael W. Singleton, Houston, all of Tex.; Robert M. Richmond, Bakersfield, Calif.

[73] Assignee: Gas Research Institute, Chicago, Ill.

[21] Appl. No.: 874,793

[22] Filed: Apr. 27, 1992

[51] Int. Cl.$^5$ .............................................. C02F 1/52
[52] U.S. Cl. .................................. 210/712; 210/726; 210/703; 210/805; 134/10; 134/25.1
[58] Field of Search ............... 210/726, 727, 712, 703, 210/805; 134/10, 25.1

[56] References Cited

U.S. PATENT DOCUMENTS

| | | |
|---|---|---|
| 3,259,570 | 3/1963 | Priesing et al. ............ 210/727 |
| 3,377,274 | 4/1968 | Burke et al. ............... 210/727 |
| 3,408,293 | 10/1968 | Dajani ....................... 210/727 |
| 3,887,462 | 6/1975 | Lagess et al. |
| 5,055,200 | 10/1991 | Miki et al. ................. 210/726 |

Primary Examiner—Neil McCarthy
Attorney, Agent, or Firm—Speckman, Pauley & Fejer

[57] ABSTRACT

A system and method for removing asbestos and other hazardous solids from a slurry collected during removal of insulation from pipelines, equipment and other structures. The slurry is collected in a collection pan that is attached to a shroud of a hydrocleaning machine. Solid particles are separated from the slurry by passing the slurry through various stages of filters. Pumps are used to transfer the slurry from the collection pan through the filter stages. A first flocculent is injected into the slurry to coagulate the solid particles into individual masses. A second flocculent is injected into the slurry, downstream from the injection point of the first flocculent, in order to coagulate a majority of the remaining solid particles. The coagulated masses of solid particles are removed by passing the slurry through a screen shaker. The slurry discharged from the screen shaker is then passed through further filters.

9 Claims, 7 Drawing Sheets

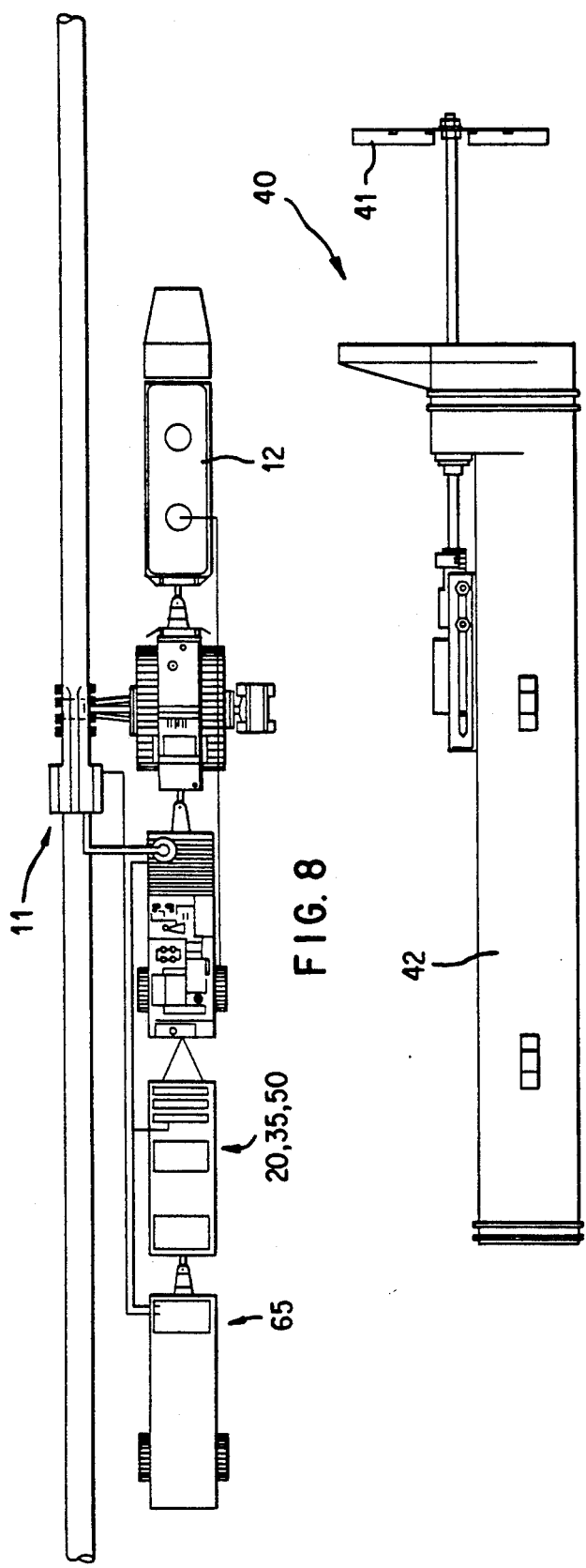
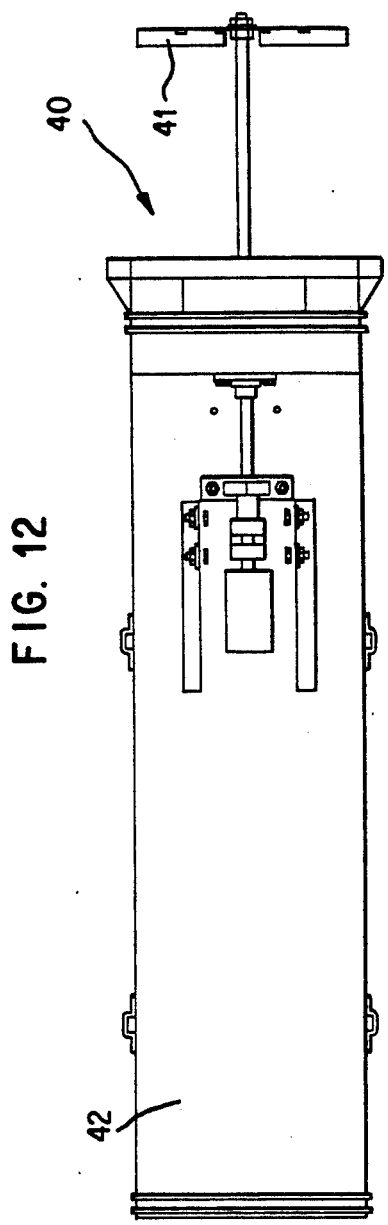
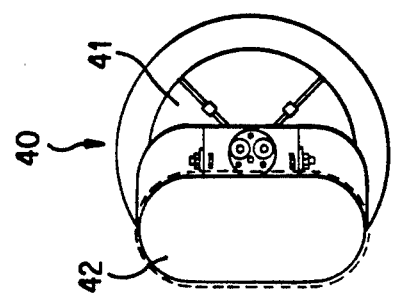

SYSTEM AND METHOD FOR REMOVING ASBESTOS PARTICLES FROM A SLURRY

BACKGROUND OF THE INVENTION

1. Field of the Invention

This invention relates to a system and method for removing asbestos and other contaminated or hazardous solids from a slurry which is collected during removal of insulation from pipelines, equipment and other similar structures.

2. Description of Prior Art

U.S. Pat. Nos. 5,052,423 and 5,074,323 disclose an apparatus for hydrocleaning the exterior surface of a pipeline or the like. A plurality of liquid jet nozzles are mounted with respect to a frame so as to surround, during use, the pipeline in circumferentially spaced apart relationship to one another. High-pressure liquid is supplied to the liquid jet nozzles. The frame travels longitudinally relative to the pipeline to effect cleaning of the pipeline exterior surface.

U.S. Pat. No. 4,809,391 teaches an apparatus for removing contaminant material from a building. The apparatus is a box-shaped device for removing asbestos from horizontally and vertically arranged pipes. A plurality of glove apertures are formed in two opposing sidewalls of a box-shaped device. A glove is connected to the sidewall at each aperture and the glove extends into the enclosure. The enclosure operates at a negative pressure. A filter is used at each suction aperture to trap airborne asbestos material.

U.S. Pat. No. 4,723,969 discloses an apparatus and process for removing asbestos and other hazardous material. A vacuum loader is used to remove, collect, seal and dispose asbestos and other hazardous material. The vacuum loader includes a bulk separator compartment, a filtering compartment downstream of the bulk separator, and a collector compartment having a dust settlement chamber.

U.S. Pat. Nos. 4,718,925 and 4,749,391 teach a material collection receiver having a bag assembly with a porous or perforated inner bag positioned within the interior of a solid imperforate bag. A perforated inner shell is used to accommodate expansion of the bags. A shroud prevents hazardous material from contaminating the outside of the outer bag. A vacuum tank surrounds the shroud.

U.S. Pat. No. 4,897,121 discloses a process for removing asbestos-filled linings or coatings applied on a surface of a building. U.S. Pat. No. 4,002,004 teaches a method for packaging asbestos fibers into consolidated blocks.

Other conventional methods for removing and disposing of asbestos and other hazardous material include: wet-bag methods that conform to Environmental Protection Agency standards; hand-scraping; hand-held high-pressure waterlances; line travel knife and brush equipment; rotating abrasive wheels; machine blasting with sand or other particles; and line travel high-pressure water jetting equipment. According to the wet-bag methods, asbestos materials are dampened. The dampened pieces of asbestos and other hazardous material are then removed by hand and placed into special storage bags.

It is apparent that there exists a need for an automated system and method for collecting and separating asbestos and other hazardous materials and disposing of such materials within guidelines established by the Environmental Protection Agency (EPA), Occupational Safety and Health Administration (OSHA), or by other governing standards.

SUMMARY OF THE INVENTION

It is one object of this invention to provide a system and method for automatically removing and separating asbestos and other hazardous material.

It is another object of this invention to provide an automated system and method for removing solid particles from a slurry by injecting a first flocculent into the slurry and preferably injecting a second flocculent into the slurry, downstream from the injection point of the first flocculent.

The above-mentioned and other objects of this invention are accomplished with a system for removing asbestos and other hazardous solids from a slurry collected during removal of insulation from pipelines, equipment and other similar structures, wherein the system includes a collection pan which is attached to a shroud of a hydrocleaning machine. The hydrocleaning machine uses high-pressure water to blast asbestos and other insulation materials away from a pipeline, equipment, or other similar structure. The water and solid particles form a slurry which is preferably collected within the collection pan.

A first flocculent, preferably an anionic polymer flocculent, is injected into the slurry. The first flocculent causes formation of individual masses of solid particles. The second flocculent, preferably a cationic polymer flocculent, is injected into the slurry downstream from the point of injection of the first flocculent. The second flocculent causes a majority of individual particles remaining in the slurry, after injection of the first flocculent, to form individual masses.

After the flocculent injection, the slurry is passed through a screen shaker for separating a first portion of the solid particles and discharging a first remaining portion of the solid particles with the slurry. The first remaining portion of the slurry is then passed through an air flotation cell, or other similar filter or separator, for removing a second portion of the solid particles and discharging a second remaining portion of the solid particles with the slurry. The second remaining portion of the slurry discharged from the air flotation cell is then passed through at least one cartridge filter, bag filter or other fine particulate filter. The water discharged from the cartridge filter or other suitable filter preferably meets required emissions standards, such as Resource Conservation and Recovery Act (RCRA), OSHA, EPA and/or other governing standards.

In one preferred embodiment according to this invention, at least a portion of the water discharged from the cartridge filter or other suitable filter is recycled back to the shroud of the hydrocleaning machine. Such recycled water is preferably used to rinse the pipeline after the hydrocleaning machine has stripped the pipeline. The recycled water can also be used to fluidize the solid particles and thus form the slurry. It is apparent that the recycled water can be sent either directly to the shroud and/or the collection pan of the hydrocleaning machine or directly to the fresh water tank.

BRIEF DESCRIPTION OF THE DRAWINGS

The above-mentioned and other features of this invention will become more apparent when viewed in conjunction with the drawings wherein:

FIG. 8 is a plan view of a system train according to one preferred embodiment of this invention;

FIG. 11 is a front view of a slinger apparatus, according to one preferred embodiment of this invention;

FIG. 12 is a side view of the slinger apparatus shown in FIG. 11; and

FIG. 13 is an end view of the slinger apparatus shown in FIG. 11.

DESCRIPTION OF PREFERRED EMBODIMENTS

Figure 2:
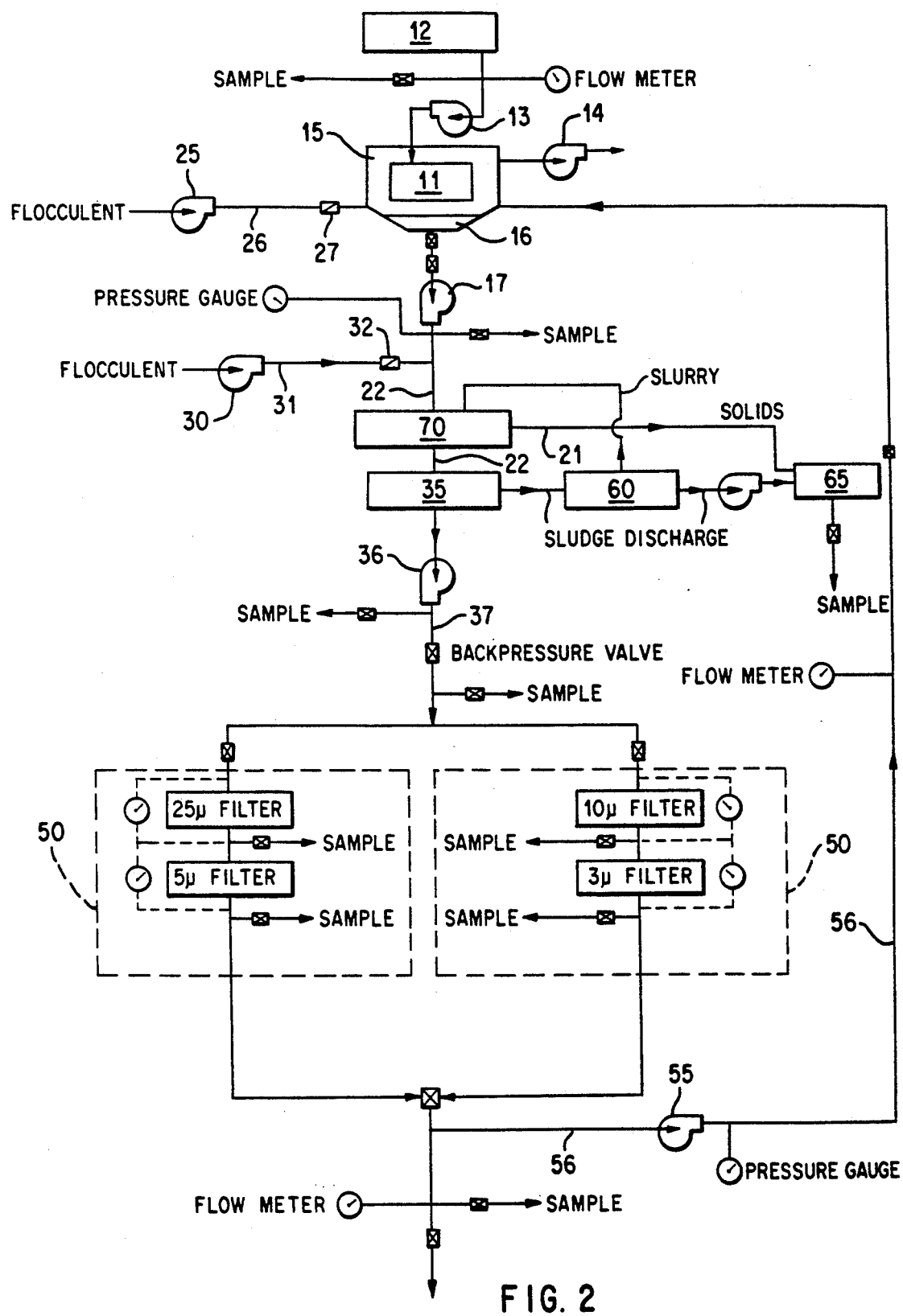
FIG. 2 is a diagrammatic flow diagram showing a method and system arrangement similar to that shown in FIG. 1.

U.S. Pat. Nos. 5,052,423 and 5,074,323 teach a process and apparatus for hydrocleaning the exterior surface of a pipeline to remove coatings, particularly coatings containing asbestos materials. The teachings of such references are incorporated into this specification by reference thereto. As shown in FIG. 2, hydrocleaning machine 11 is preferably an apparatus similar to the hydrocleaning apparatuses taught by U.S. Pat. Nos. 5,052,423 and 5,074,323. However, it is apparent that the system and method of this invention can be used with other conventional apparatuses for removing insulation and other coatings from a pipeline, a piece of equipment, or another structure. Generally speaking, this invention relates to a system and method for collecting, separating and filtering asbestos particles and other hazardous or undesirable solid particles within a slurry which is generated from conventional apparatuses or methods for removing such solids.

Collection means are used to collect a slurry resulting from the hydrocleaning process. Typically, such slurry contains asbestos and possibly other hazardous or undesirable solids. According to one preferred embodiment of this invention, the collection means comprise collection pan 16 which is preferably attached to shroud 15 of hydrocleaning machine 11. The collection means may also comprise a particle shredder, not shown in the drawings, which is preferably mounted within a lower portion of collection pan 16. The particle shredder comprises rotating fingers that pass between stationary members attached to the shredder walls. The particle shredder preferably sheers all large solid particles to a given size, such as a size no larger than approximately one-half inch. It is apparent that the collection means may comprise any other suitable device for collecting and/or storing such slurry.

Separation means are used to separate solid particles from the slurry. Such solid particles typically include asbestos and may also include other hazardous solid particles. In one preferred embodiment according to this invention, the separation means comprise first filtration means for separating or filtering a first portion of the solid particles and for discharging a first remaining portion of the solid particles with the slurry. As shown in FIGS. 1, 2, 4 and 5 and according to one preferred embodiment of this invention, the first filtration means comprise screen shaker 70. It is apparent that any other suitable separation device can be used. However, the screen shaker is effective and relatively economical for removing large masses of the solid particles.

Figure 3:
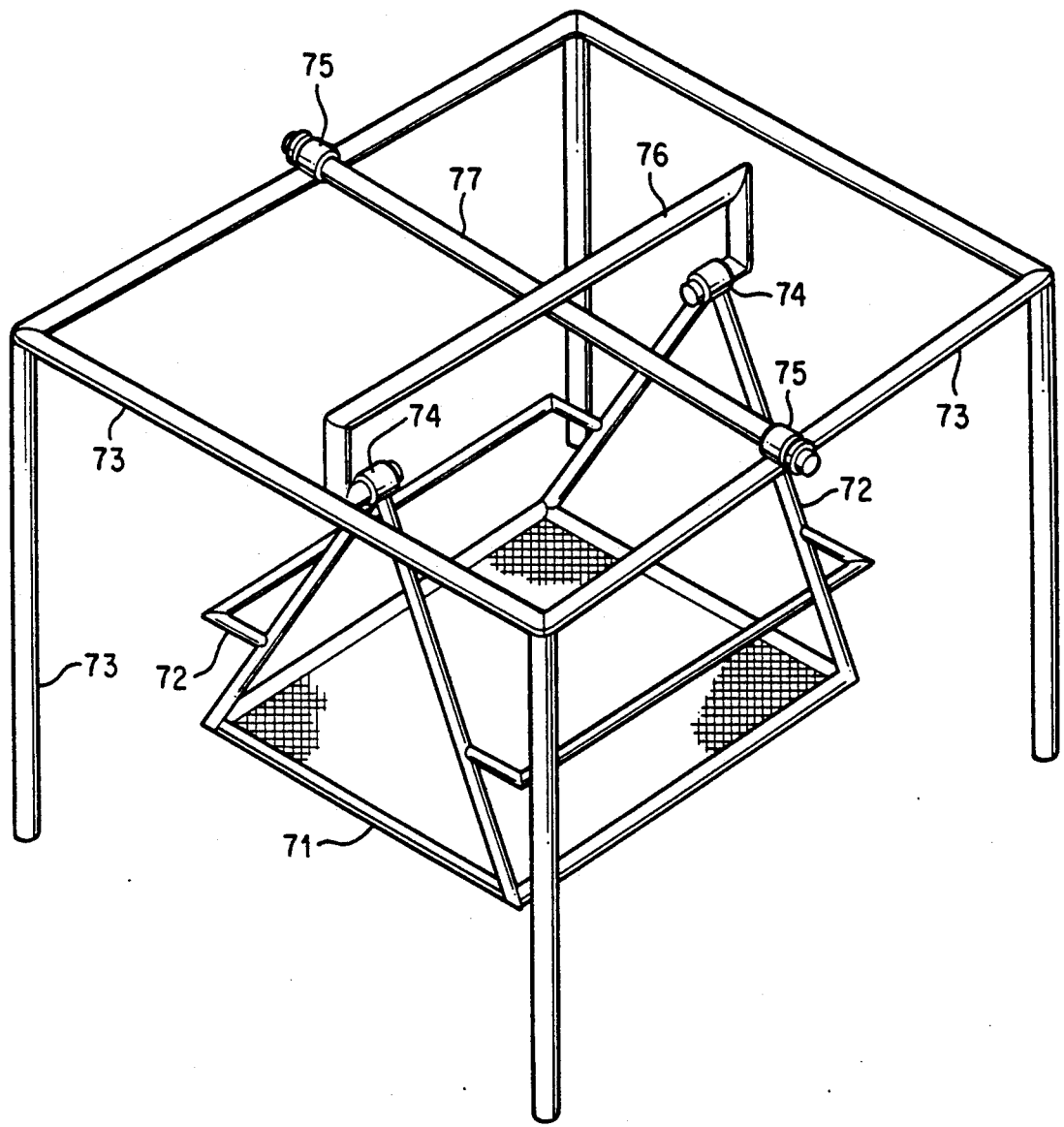
FIG. 3 is a diagrammatic perspective view of a gimbal device that can accommodate a screen shaker, according to one preferred embodiment of this invention.
Figure 6:
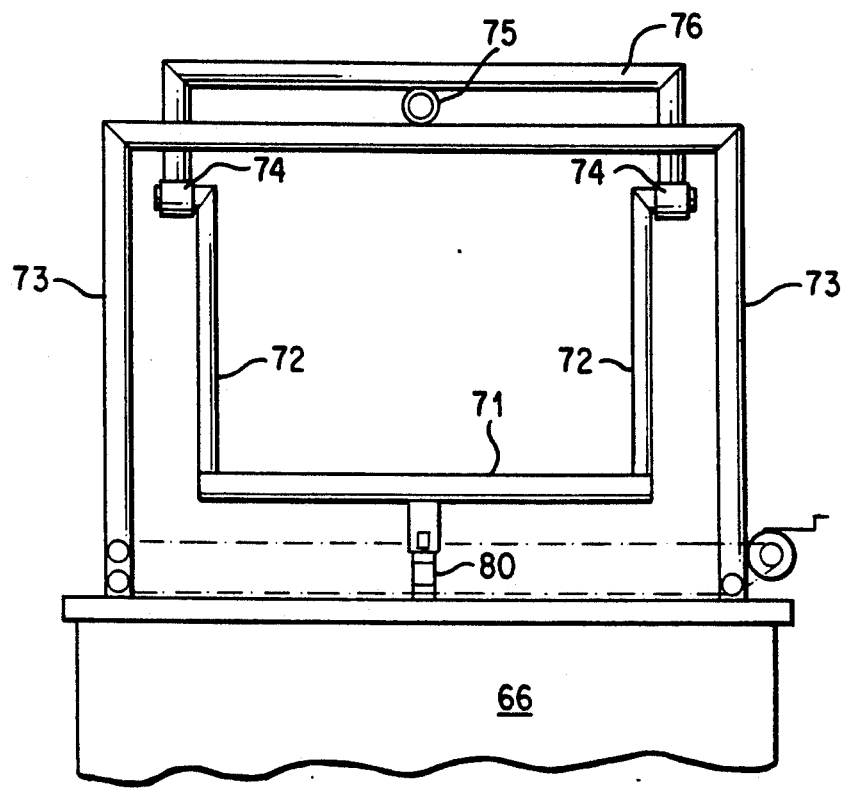
FIG. 6 is a front view of a gimbal device mounted on a disposal container, that accommodates a disposable bladder bag, according to another preferred embodiment of this invention.
Figure 7:
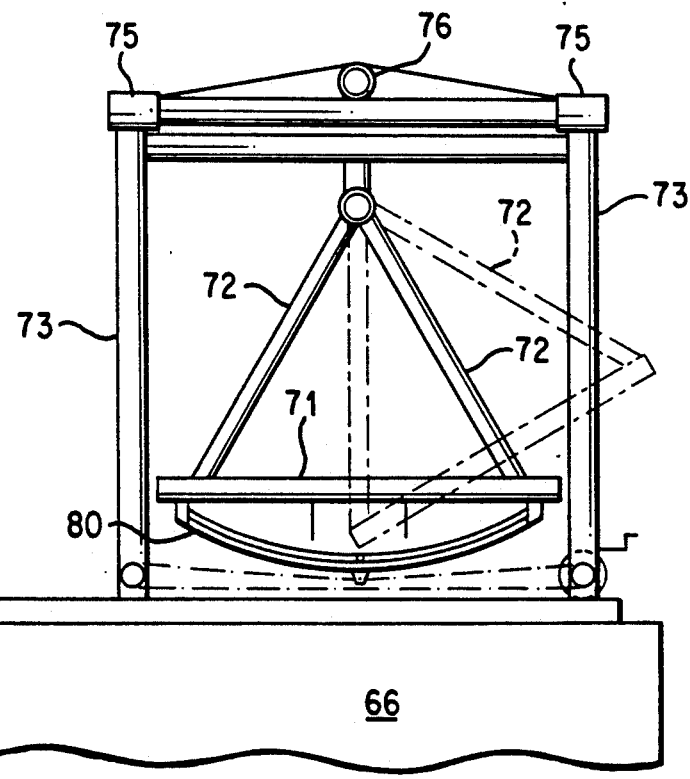
FIG. 7 is a side view of the mounted gimbal device, as shown in FIG. 6.

FIGS. 3, 6 and 7 show various embodiments of a gimbal device upon which screen shaker 70 can be mounted, according to this invention. As shown in FIG. 3, screen shaker support 71 is attached to frame 72. Gimbal bearings 74 are used to rotatably attach frame 72 with respect to frame 73. Crossbar 76 is secured to crossbar 77 in any suitable manner known to those skilled in the art. Gimbal bearings 75 are used to rotatably attach crossbar 77 with respect to frame 73.

Figure 4:
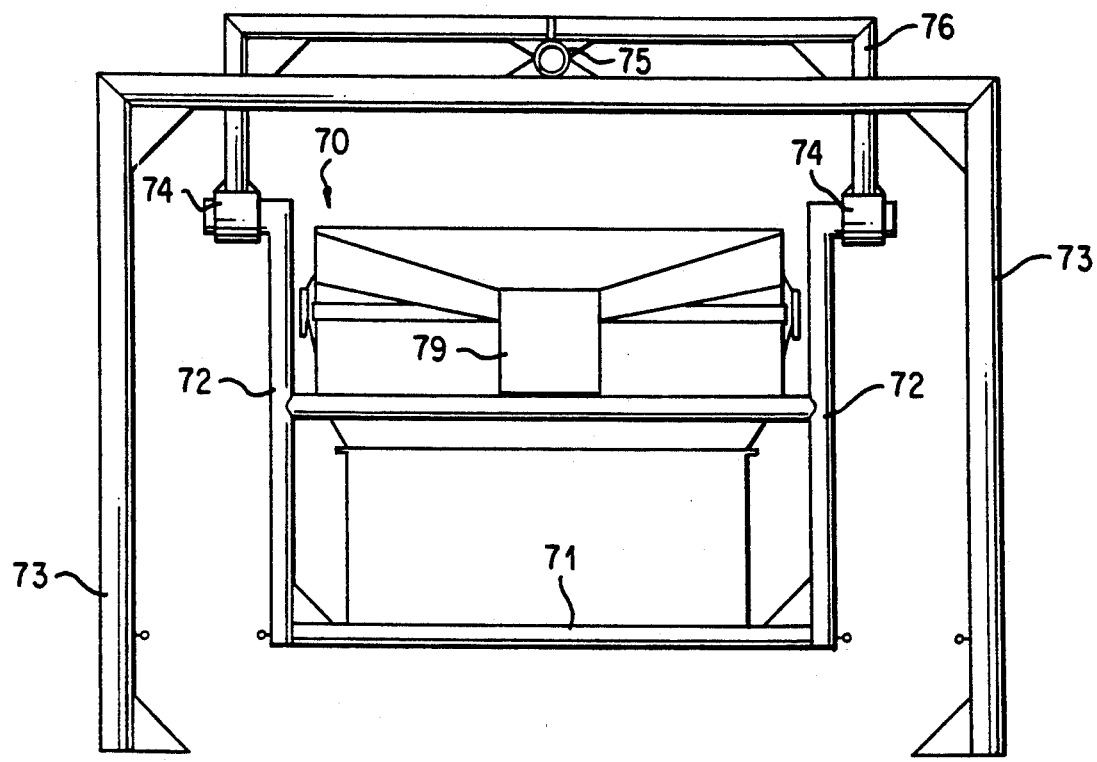
FIG. 4 is a detailed front view of a screen shaker mounted in a gimbal device, similar to the gimbal device shown in FIG. 3.
Figure 5:
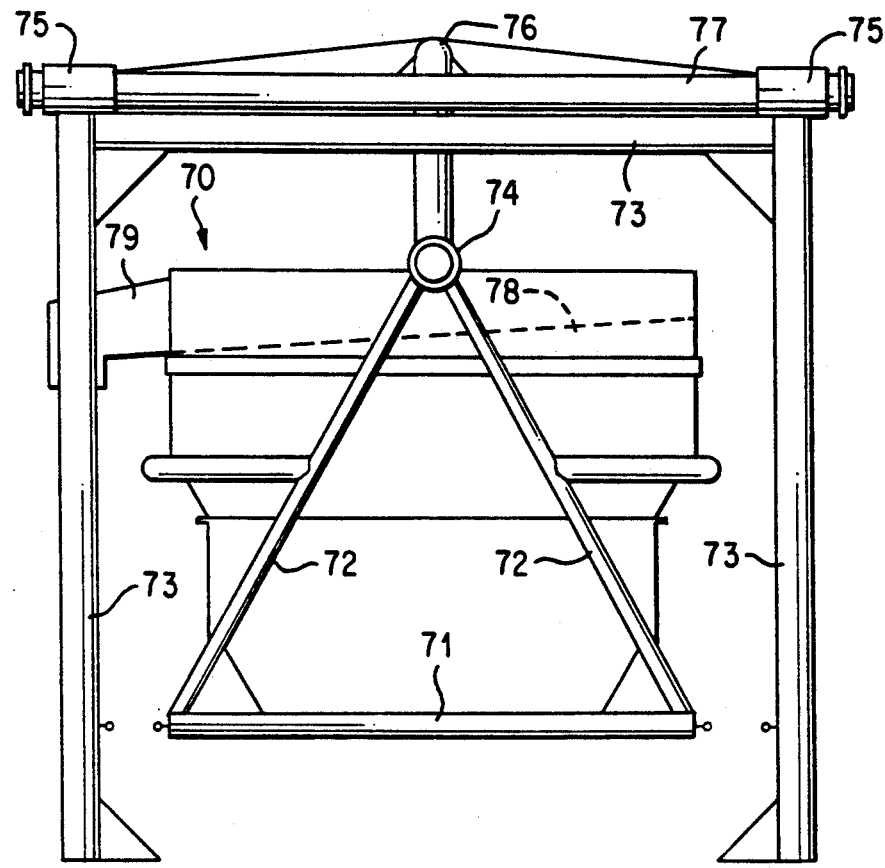
FIG. 5 is a detailed side view of the screen shaker mounted in the gimbal device, as shown in FIG. 4.

FIGS. 4 and 5 show screen shaker 70 mounted within a gimbal device similar to those shown in FIGS. 6 and 7. As shown in FIG. 5, screen 78 is attached or mounted within the housing of screen shaker 70. Screen 78 is preferably mounted at an incline so that the sludge and other solids can flow or travel through discharge 79.

As shown in FIGS. 6 and 7, the gimbal device that accommodates screen shaker 70 is mounted to container 66. Container 66 is preferably mounted on a transportable skid that is transported by a train, as discussed later in this specification. Because of the various terrains upon which the transportable skid is transported, frame 73 is often positioned at various angles with respect to the ground, as the gimbal device and screen shaker 70 are transported. The overall result of the gimbal device and screen shaker 70, as shown in FIGS. 3–7, is that screen shaker 70 remains level with respect to the ground and gravitational forces. Thus, as frame 73 moves at various angles with respect to the ground and gravity, screen shaker 70 will remain level so that the sludge material does not slide or shift to any one particular side of screen shaker 70, due to gravitational forces. As shown in FIGS. 6 and 7, lockup mechanism 80 is used to prevent unwanted shifting of the gimbal device, for example, as the transportable skid is started or moved from a zero-acceleration condition.

Screen shaker 70 is vibrated so that a shaking action is imparted to either the housing of screen shaker 70 or frame 73 and thus screen 78. It is apparent that frame 73 and/or screen 78 can be mechanically vibrated by any suitable vibration means known to those skilled in the art. The vibration means are preferably housed within the lower portion of the housing of screen shaker 70.

As shown in FIG. 2, shroud 15 preferably operates at a slight vacuum pressure in order to prevent undesirable solid particles from discharging outside of shroud 15. Vacuum pump 14 maintains a negative pressure within shroud 15. Vacuum pump 14 is preferably a HEPA vacuum pump which is typically rated with a minimum efficiency of 99.99% at 0.3 microns, D.O.P. method, such as those available commercially from a company named Pullman/Holt. Fresh water tank 12 is preferably used to supply water to high-pressure fresh water pump 13, which is upstream of hydrocleaning machine 11.

Transfer pump 17 is used to move the slurry from collection pan 16 to screen shaker 70 or another suitable first filtration means. Transfer pump 17 discharges into slurry conduit 22 which discharges to screen shaker 70. Transfer pump 17 is preferably an impeller pump with an automatic air ejector priming device but could also be a peristaltic hose pump or another suitable pump known to those skilled in the art. Transfer pump 17 is preferably the same as or similar to a Model DP21-76PB pump which is commercially available from Godwin Pumps of America, Inc. of Bridgeport, N.J.

Figure 1:
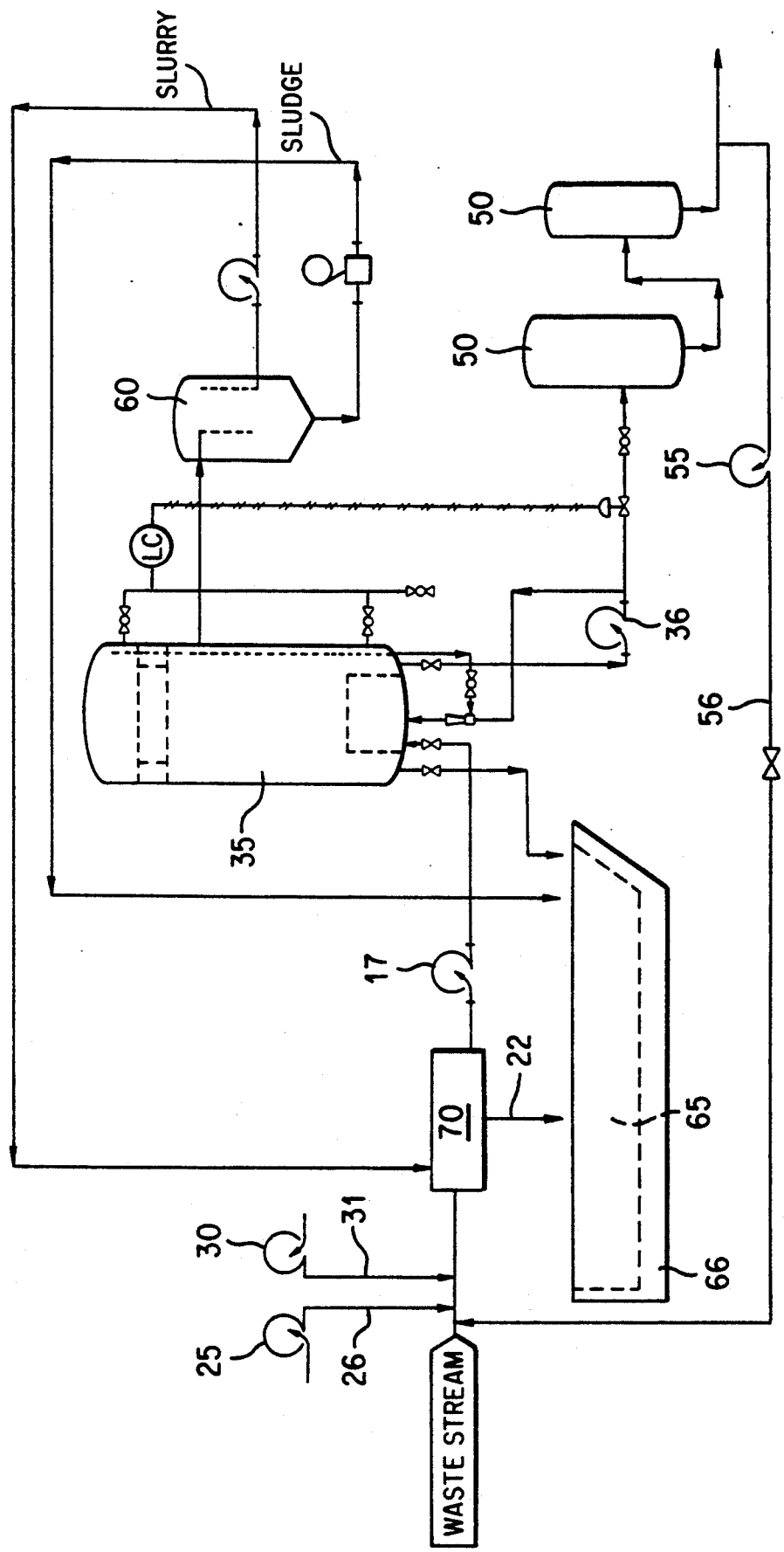
FIG. 1 is a process flow diagram showing a method and system arrangement for separating asbestos particles and other hazardous or undesirable solid particles, according to one preferred embodiment of this invention.

Flocculent injection means are used to inject a first flocculent into the slurry and to preferably inject a second flocculent into the slurry, downstream from the injection point of the first flocculent. As shown in FIGS. 1 and 2, injection pump 25 is used to inject the first flocculent into the slurry. Injection pump 25 discharges through injection conduit 26 and into shroud 15. Check valve 27 is preferably installed within injection conduit 26. The first flocculent is preferably injected into shroud 15 so that individual masses of the solid particles begin to form in the slurry within shroud 15. However, it is apparent that the first flocculent can be injected at other points within the slurry flow.

The flocculent injection means may also comprise injection pump 30 which discharges a second flocculent through injection conduit 31 and check valve 32 and then into the slurry, preferably upstream of screen shaker 70 or another suitable first filtration means. It is apparent that only the first flocculent must be injected into the slurry to accomplish the objective of this invention; however, injecting a second flocculent is advantageous since it significantly reduces the need for filter changes downstream from screen shaker 70. Injection pumps 25 and 30 are each preferably a PolyBlend® automated polymer feed system, commercially available from Stranco, Inc. of Bradley, Ill., or other similar pump or feed system. It is apparent that either injection pump 25 or 30 can be replaced with other suitable means apparent to those skilled in the art for introducing the flocculent into the slurry stream.

According to another preferred embodiment of this invention, the separation means further comprise second filtration means for separating a second portion of the solid particles and for discharging a second remaining portion of the solid particles with the slurry. As shown in FIGS. 1 and 2, the second filtration means comprise air flotation cell 35. It is apparent that other suitable and conventional filters and/or separators can be used in lieu of the air flotation cell. However, air flotation cell 35 is proven as an effective second filtration means. One preferred and suitable air flotation cell is commercially available from ANDERSONICS, of Bakersfield, Calif. In such air flotation cell, the influent is directed tangentially into a center well. A centrifuge action promotes migration of droplets to the center of the apparatus. Water migrates to a stilling area of the apparatus. The migrated clean water is drawn off by a suction pump. Such suction pump provides motive force for gas induction and enough head to transfer the clean fluids from the apparatus. The high pressure is forced back into the vessel to induce the gas and air which is pulled off of a gas cap at the top of the apparatus. The asbestos and other hazardous or undesirable solid particles attach to the bubbles and are lifted to a skim trough. The skim produced is then discharged as sludge to surge tank 60, as shown FIG. 2. As shown in FIG. 2, a slurry from surge tank 60 is recycled back to screen shaker 70, or another suitable first filtration means, and the sludge is discharged from surge tank 60 to bladder 65. Bladder 65 also accepts solids discharged through solids discharge conduit 21 from screen shaker 70. Bladder 65 is preferably mounted within container 66, which is shown in FIGS. 6 and 7.

FIGS. 11–13 show one preferred embodiment of slinger 40, according to this invention. Slinger 40 is used to evenly distribute the sludge material that is deposited into bladder 65, or any other suitable container. Because the sludge product according to this invention has such a lower water content, the deposited sludge tends to pile without completely filling bladder 65 or another suitable container. Slinger 40 is used to evenly distribute the separated-out solid particles or sludge material so that bladder 65 or another suitable container can be completely filled, rather than only partially filled.

According to one preferred embodiment of this invention, slinger 40 is secured with respect to frame 73 by any suitable means known to those skilled in the art. A flexible hose or conduit is preferably positioned between discharge 79 and passage 42 of slinger 40. The solids which are separated from the slurry by screen shaker 70 are routed through passage 42 and fall onto slinger plate 41. Slinger plate 41 rotates at a suitable speed and thus evenly distributes the solids completely within bladder 65.

In another preferred embodiment according to this invention, the separation means further comprise third filtration means for separating a third portion of the solid particles and for discharging a third remaining portion of the solid particles with the slurry. The third filtration means may comprise one or more cartridge filters 50 for removing enough of the solid particles from the third remaining portion of the slurry to meet required emissions standards, such as those set by RCRA, OSHA, EPA and/or other governing bodies. FIG. 2 shows two different arrangements for cartridge filter 50, either or both of which can be used in the system. The third remaining portion of the slurry which is discharged by slurry pump 36 from the discharge of air flotation cell 35 flows through slurry conduit 37 to at least one preferred cartridge filter 50.

As shown in FIG. 2, each cartridge filter 50 can be blocked and bypassed. Cartridge filter 50 may be an in-line separator, such as an IL-B/S in-line separator which is commercially available from Claude Laval Corporation of Fresno, Calif. However, it is also apparent that other suitable bag filters or suitable fine particulate filters can be used in lieu of or in conjunction with the cartridge filter.

At least a portion of the separated slurry discharged from cartridge filter 50 can be recirculated back to fresh water tank 12 or to shroud 15 of hydrocleaning machine 11. Recirculation means are used to recycle the separated slurry. According to one preferred embodiment to this invention, the recirculation means comprise recirculation pump 55 and recirculation conduit 56. However, it is apparent that other suitable fluid transfer apparatuses can be used to recirculate or recycle the separated slurry. The water discharged from cartridge filter 50 which meets the required emissions standards may also be discharged to ground.

Transfer means are used to transfer the slurry throughout the system. As shown FIGS. 1 and 2, the transfer means comprise transfer pump 17 and slurry pump 36. However, it is apparent that other suitable positive pressure pumps and/or vacuum pumps can be positioned throughout the system to accomplish the slurry transfer.

Figure 9:
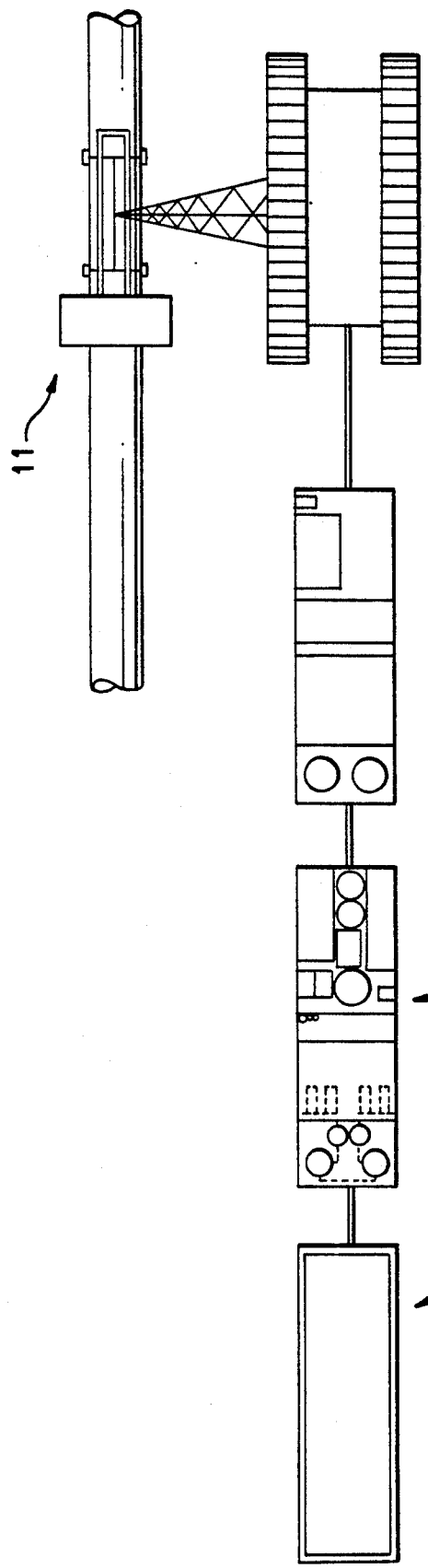
FIG. 9 is a plan view of a system train according to another preferred embodiment of this invention.
Figure 10:
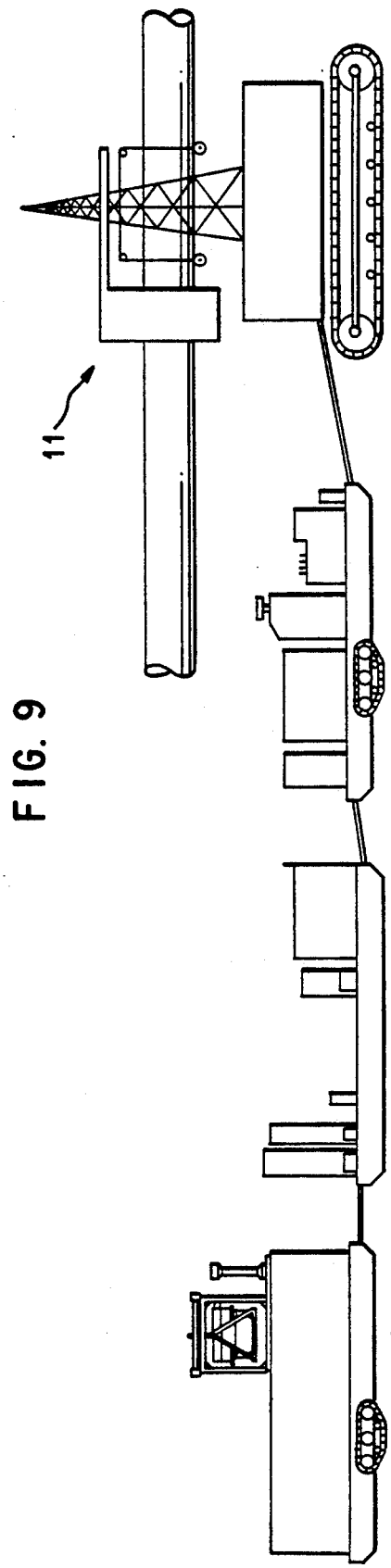
FIG. 10 is a front view of the system train shown in FIG. 9.

FIGS. 8-10 show various arrangements of a system train according to this invention, the system elements are preferably mounted on transportable skids. As shown in FIG. 8, fresh water tank 12 moves with a sideboom tractor or the like and the remaining system train moves in an axial direction, with respect to the pipeline. The sideboom tractor cradles the pipeline and hydrocleaning machine 11 propels itself, according to one preferred embodiment of this invention.

According to another preferred embodiment of this invention, the method for removing asbestos particles and other hazardous or undesirable solid particles from a slurry collected during removal of insulation from pipelines, equipment or other structures, begins with transferring the slurry from the collection means to the separation means. At least a portion of the solid particles are separated from the slurry by injecting a first flocculent into the slurry. More solid particles can be separated from the slurry by injecting a second flocculent into the slurry, downstream from the injection point of the first flocculent. The first flocculent preferably is an anionic (emulsion) polymer flocculent, such as a flocculent which is commercially available and known as JAYFLOC TM 803, from Exxon Chemical Company. Such flocculent is effective in forming individual masses of approximately 80-90% of the solid particles. The anionic polymer flocculent has a net negative charge.

One preferred type of the second flocculent is JAYFLOC TM 838 Liquid Cationic Polyelectrolyte, a cationic (solution) polymer commercially available from Exxon Chemical Company, which is a coagulant with a high molecular weight and a very high charge density. The cationic polymer flocculent has a net positive charge and thus coagulates a majority of the remaining solid particles to form individual masses that tend to coagulate with the individual masses of solid particles formed by the first anionic polymer flocculent.

All individual masses of solid particles are passed with the slurry through screen shaker 70. The second flocculent is preferably injected into the slurry between the collection means and the separation means.

The method of this invention also includes transferring the slurry through the filtration means and the other elements of the system, as previously discussed in this specification, until the effluent meets required environmental emission and/or other safety standards. As indicated in FIG. 2, samples of the water or the slurry can be taken throughout various points within the system. The water or slurry quality can be determined at such various sample points within the system and the valves can be used to control the system and thus vary the qualities of the water or slurry.

While in the foregoing specification this invention has been described in relation to certain preferred embodiments thereof, and many details have been set forth for purpose of illustration it will be apparent to those skilled in the art that the invention is susceptible to additional embodiments and that certain of the details described herein can be varied considerably without departing from the basic principles of the invention.

We claim:

1. A method for removing asbestos and other hazardous solid particles from a slurry collected during removal of insulation from pipelines, equipment or other structures, the method including:
    (a) transferring the slurry from collection means to separation means;
    (b) injecting a first flocculent into the slurry and injecting a second flocculent into the slurry downstream from the injection of the first flocculent; and
    (c) separating a first portion of solid particles from the slurry in a first separation means thereby forming a first remaining slurry containing solid particles, and
    (d) separating a second portion of solid particles from said first remaining slurry to form a second remaining slurry containing solid particles, and
    (e) separating a third portion of solid particles from said second remaining slurry to form water recyclable to said process of removing insulation from pipelines, equipment or other structures.

2. A method according to claim 1 wherein the slurry is collected in a collection pan attached to a shroud of a hydrocleaning machine.

3. A method according to claim 1 wherein the slurry is passed through a particle shredder within a shroud of a hydrocleaning machine.

4. A method according to claim 1 wherein the first portion of the solid particles is separated by passing the slurry through a screen shaker.

5. A method according to claim 1 wherein the second portion of the solid particles is removed by passing the first remaining slurry through an air flotation cell.

6. A method according to claim 1 wherein the third portion of the solid particles is removed by passing the second remaining slurry through at least one cartridge filter.

7. A method according to claim 1 wherein the third portion of the solid particles is removed by passing the second remaining slurry through at least one bag filter.

8. A method according to claim 1 wherein the second remaining slurry is filtered to remove enough of the solid particles to meet required emission standards.

9. A method according to claim 1 wherein:
    the first flocculent is injected into the slurry by introducing the first flocculent into collection means for collecting the slurry, and said second flocculent is injected into the slurry before separating the first portion of the solid particles from the slurry.

* * * * *